United States Patent

Nonaka et al.

[11] Patent Number: 5,446,821
[45] Date of Patent: Aug. 29, 1995

[54] COATED OPTICAL FIBER

[75] Inventors: Tsuyoshi Nonaka; Nobuhiro Akasaka, both of Kanagawa, Japan

[73] Assignee: Sumitomo Electric Industries, Ltd., Osaka, Japan

[21] Appl. No.: 309,591

[22] Filed: Sep. 21, 1994

[51] Int. Cl.⁶ ............................................. G02B 6/22
[52] U.S. Cl. ........................ 385/128; 385/126; 385/127; 385/123; 385/114
[58] Field of Search ............... 385/123, 126, 127, 128, 385/114, 147, 141; 427/162, 163

[56] References Cited

U.S. PATENT DOCUMENTS

| | | | |
|---|---|---|---|
| 4,629,285 | 12/1986 | Carter et al. | 385/128 X |
| 4,828,349 | 5/1989 | Nakasuji | 385/114 X |
| 4,900,126 | 2/1990 | Jackson | 385/114 X |
| 4,953,945 | 9/1990 | Nishimura et al. | 385/114 X |
| 5,062,685 | 11/1991 | Cain et al. | 385/114 X |
| 5,074,643 | 12/1991 | Petisce | 385/128 |
| 5,082,347 | 1/1992 | Akasaka et al. | 385/114 |
| 5,181,268 | 1/1993 | Chien | 385/128 |
| 5,245,134 | 9/1993 | Vana, Jr. et al. | 385/114 X |
| 5,259,060 | 11/1993 | Edward et al. | 385/128 |
| 5,377,292 | 12/1994 | Bartling et al. | 385/128 |

*Primary Examiner*—Brian Healy
*Attorney, Agent, or Firm*—Cushman Darby & Cushman

[57] ABSTRACT

A coated optical fiber includes an optical fiber, a primary coating layer disposed on the optical fiber, and a colored layer provided on the primary coating layer. Ink used in the colored layer has small change of weight due to immersion into water or a sensitizer in the ink has small solubility to water.

5 Claims, 1 Drawing Sheet

COATED OPTICAL FIBER

BACKGROUND OF THE INVENTION

The present invention relates to a coated optical fiber used for optical communication or the like, and particularly to a coated optical fiber with a colored layer.

In optical fibers used for optical communication, it is said to be preferable that irrespective of the kind of optical fibers such as an optical glass fiber or a quartz glass fiber, a plastic coating layer (primary coating layer) is provided immediately after a fiber is prepared. This coating is conducted so as to prevent cracks from occurring on the surface of the fiber due to the preparation of the fiber or to prevent the strength of the fiber from lowering by the growth of cracks due to exposure of the bare fiber to air. As such a plastic layer, in general, a thermosetting silicone resin, an ultraviolet curing resin (hereinafter referred to as UV resin), a radiation curing resin and the like are used. In recent years, the UV resin is especially used.

Microbending, which degrades the transmission characteristics of an optical fiber, is generated by various stresses from the outside. The coating layer also functions to protect the optical fiber from those stresses. In general, the coating layer is often made into a so-called two-layer coating structure in which an inner layer is made of a resin with a relatively low Young's modulus to form a buffer layer, and an outer layer is made of a resin having a relatively high Young's modulus to form a protective layer. For example, an optical fiber using a UV resin (hereinafter referred to as UV resin coated optical fiber) is formed by continuously coating a UV resin by using a coating die to an optical fiber which is formed from a preform through melting and wiredrawing by a wiredrawing furnace, and curing the coated UV resin by irradiation of ultraviolet rays. One or a plurality of such UV resin coated optical fibers are further coated with a secondary coating layer to form a coated optical fiber. As the secondary coating layer, for identification, a colored layer may be coated to each UV resin coated optical fiber. The fiber coated with the colored layer is referred to as a colored coated fiber. As ink used for the colored layer, ink cured by ultraviolet rays (hereinafter referred to as ultraviolet curing ink) or thermosetting ink set by heat is generally used.

As a structure suitable for a high density cable, a ribbon optical fiber is used in which a plurality of the above mentioned colored coated optical fibers are arranged side by side, and a common coating layer of a UV resin or the like is applied to the outside of those fibers. When this ribbon optical fiber is used in a high humidity atmosphere, there arises a case that a transmission loss is extremely increased. As a result of studying the cause thereof, it was found that abnormal expanded portions due to the absorption of humidity are generated between the primary coating layer and the secondary coating layer or between the secondary coating layer and the common coating layer, which apply stresses to the fiber so that the loss is increased.

SUMMARY OF THE INVENTION

In order to obtain a ribbon optical fiber, which does not have the above mentioned abnormal expanded portions so that the transmission loss of which is not increased even if the fiber is used under a high humidity atmosphere for a long time or the transmission loss of which is not increased in a short time even if the fiber is immersed in water by some accident, various studies and developments were conducted. As a result, it was found to be effective that ink used for the secondary coating layer of the colored layer is such that when the ink is immersed in water, the change of weight thereof is less than 3% in the temperature range in which the ribbon optical fiber is used, or it was found to be effective that when the ink used is ultraviolet curing ink, a sensitizer used in the ink has small solubility to water in the temperature range in which the ribbon optical fiber is used. Thus, the present invention was made. When the sensitizer includes only one component, it is necessary that the solubility of the component itself is not greater than 0.2 (g/liter). When the sensitizer includes a plurality of components, it is necessary that a total of the components has the solubility of not greater than 0.2 (g/liter). As the sensitizer for decreasing the amount of water absorption by the ink, or as the sensitizer having small solubility, 2-n-butoxyethyl-4-dimethylbenzoate, P-dimethyl aminobenzoate ethyl and the like are exemplified.

The mechanism of generation of the abnormal expansion phenomenon is considered as follows. That is, when the ribbon optical fiber is left in the high humidity atmosphere, moisture moves through the common coating layer and reaches an interface between the secondary coating layer and the common coating layer, or an interface between the secondary coating layer and the primary coating layer. At this time, in these interfaces, there are portions (voids) where bonding is not conducted microscopically, so that the moved moisture is collected into the voids and condensed. When the sensitizer included in the ink of the secondary coating layer is dissolved in this condensed water, the force (osmotic pressure) of diluting the concentration is naturally generated, so that the osmosis of moisture is accelerated and finally, the abnormal expansion phenomenon occurs.

Ink used as the secondary coating layer is generally composed of an acryoligomer reactive diluent, initiator, sensitizer, pigment and the like. The sensitizer is an indispensable component to increase the curing speed of the ink. Even after the sensitizer makes the ink cured into a three-dimensional mesh state, it is not fixed to the mesh but may absorb water or may be dissolved in the water. When it is dissolved in the water in the void, it causes the abnormal expansion phenomenon. The present invention is characterized in that a sensitizer which absorbs water little and has small solubility to the water, is used so that the water absorption of the sensitizer or solution of the sensitizer into the water in the void is prevented, and as a result, the abnormal expansion phenomenon is prevented so as to prevent the increase of transmission loss of the optical fiber.

DETAILED DESCRIPTION OF THE PREFERRED EMBODIMENTS

Figure 1:
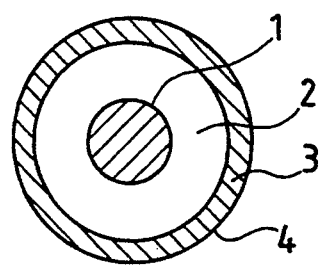
FIG. 1 is a sectional view showing a colored coated optical fiber.
Figure 2:
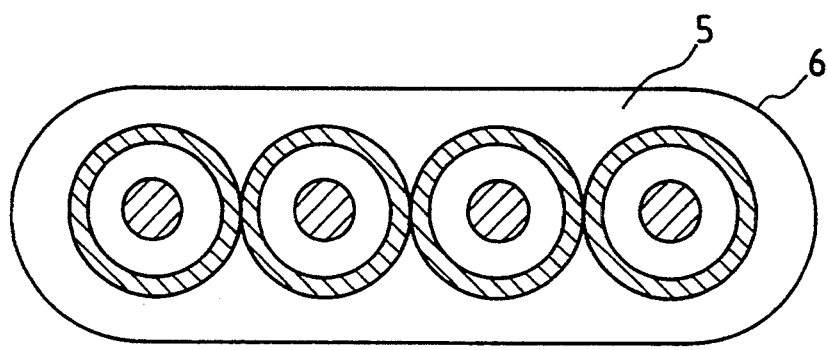
FIG. 2 is a sectional view showing a ribbon optical fiber.

Preferred embodiments of the present invention will be described in detail.

Colored coated fibers A and B were formed by providing a secondary coating layer of ink, the change of weight of which was small after and before immersion into hot water of 60° C., on a primary coating layer of two-layer coating of an ultraviolet curing urethane acrylate resin. Further, four of the respective colored coated fibers were arranged side by side and a common coating layer was provided on the outer circumference so that two ribbon optical fibers were formed. For comparison, colored coated fibers C, D and E were formed using ink, the change of weight of which was large after and before immersion into hot water of 60° C., as a secondary coating layer. Four of the respective colored fibers were arranged side by side and a common coating layer was provided on the circumference so that three ribbon optical fibers were formed. Table 1 shows the change of weight of ink used in the colored coated fibers by water absorption. The change of weight after and before immersion into hot water of 60° C. is defined as follows. That is, the weight (Wo) of a cured ink film is measured after it is dried in a constant temperature vessel of 60° C. for one day, then the weight (Wa) is measured after it is immersed in hot water of 60° C. for one day and taken out to dry again for one day in the constant temperature vessel of 60° C. The change of weight is obtained from equation 1.

$$\text{weight change} = [(Wo - Wa)/Wo] \times 100 \ (\%) \quad 1$$

TABLE 1

| | Kind of ink | | weight change of ink film after and before immersion into hot water of 60° C. |
|---|---|---|---|
| Ex. 1 | colored coated fiber A | UV curing type | 2.5% |
| Ex. 2 | colored coated fiber B | thermosetting type | 1.8% |
| Com. Ex. 1 | colored coated fiber C | UV curing type | 3.2% |
| Com. Ex. 2 | colored coated fiber D | UV curing type | 4.5% |
| Com. Ex. 3 | colored coated fiber E | thermosetting type | 4.2% |

TABLE 2

| | | type of sensitizer in ultraviolet curing ink | solubility of sensitizer in UV curing ink into hot water of 60° C. |
|---|---|---|---|
| Ex. 3 | colored coated fiber F | single component | 0.18 (g/liter) |
| Ex. 4 | colored coated fiber G | plural components | 0.15 (g/liter) |
| Com. Ex. 4 | colored coated fiber H | single component | 1.10 (g/liter) |
| Com. Ex. 5 | colored coated fiber I | plural components | 1.15 (g/liter) |

Next, colored coated optical fibers F and G were formed by providing a secondary coating layer using ultraviolet curing ink including a sensitizer with small solubility to water of 60° C. on a primary coating layer of two-layer coating of ultraviolet curing urethane acrylate resin. Further, four of the respective colored coated optical fibers were arranged side by side and a common coating layer was provided on the circumference of the four arranged fibers so that two ribbon optical fibers were formed. For comparison, colored coated fibers H and I were formed, which comprised secondary coating layers formed of ultraviolet curing ink including a sensitizer with large solubility to water of 60° C. Four of the respective coated fibers were arranged side by side and a common coating layer was provided on the circumference of the four arranged fibers so that two ribbon optical fibers were formed. Table 2 shows the solubility of a sensitizer in the ink used in the colored coated fibers to water of 60° C.

Figure 3:
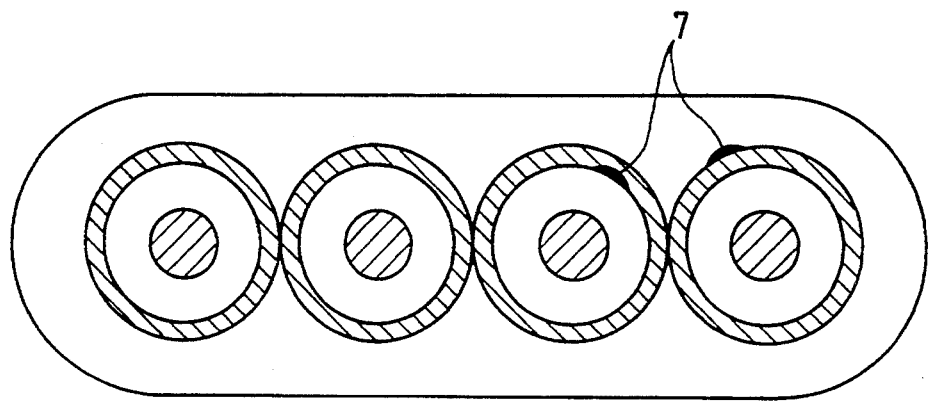
FIG. 3 is a sectional view showing a ribbon optical fiber after it was left in a high humidity atmosphere, which uses ink of a colored layer with large capability of water absorption or uses a sensitizer in the ink which has large solubility to water.

Transmission losses of ribbon optical fibers prepared by using the colored coated fibers A–E formed in the above described procedures after they were left in the atmosphere of 60° C. and relative humidity of 95% for three days, were measured at 1.55 μm band. As a result, in the comparative examples 1–3 using ink with large change of weight due to immersion into hot water of 60° C., the transmission losses were increased by 0.30 dB/km, 0.55 dB/km, 0.25 dB/km, respectively. As a result of inspecting the sections thereof, abnormal expanded portions 7 as shown in FIG. 3 were recognized. However, in the examples 1 and 2 using ink with small weight increase due to immersion into hot water of 60° C., the increase of transmission loss was not greater than 0.05 dB/km, respectively. Though the section thereof was also inspected, abnormal expanded portions were not found.

After the ribbon fibers using the colored coated fibers F–I were immersed into hot water of 40° C. for five days, the transmission losses were measured at 1.55 μm band. As a result, in comparative examples 4 and 5 using the sensitizer with large solubility to hot water of 60° C., the transmission losses were increased by 1.9 dB/km and 1.5 dB/km, respectively. As a result of inspecting the sections thereof, the abnormal expanded portions 7 as shown in FIG. 3 were recognized. On the other hand, in examples 3 and 4 using the sensitizer with small solubility to hot water of 60° C., the increase of transmission losses were not greater than 0.05 dB/km. Though the sections thereof were inspected, no abnormal expanded portions were recognized.

What is claimed is:

1. A coated optical fiber, comprising:
   an optical fiber;
   ,a primary coating layer provided on an outer circumference of said optical fiber; and
   a secondary colored coating layer provided on an outer circumference of said primary coating layer;
   wherein ink in said colored layer has weight change of less than 3% by immersion into water in a temperature range in which said coated optical fiber is used.

2. A coated optical fiber, comprising:
an optical fiber;
a primary coating layer provided on an outer circumference of said optical fiber; and
a secondary colored coating layer provided on an outer circumference of said primary coating layer;
wherein a sensitizer added to ink in said colored layer has small solubility to water.

3. A coated optical fiber, comprising:
an optical fiber;
a primary coating layer provided on an outer circumference of said optical fiber; and
a secondary colored coating layer provided on an outer circumference of said primary coating layer;
wherein a sensitizer added to ink in said colored layer contains single component and said component itself has solubility of not greater than 0.2 g/liter to water in a temperature range in which said coated optical fiber is used.

4. A coated optical fiber, comprising:
an optical fiber;
a primary coating layer provided on an outer circumference of said optical fiber; and
a secondary colored coating layer provided on an outer circumference of said primary coating layer;
wherein a sensitizer added to ink in said colored layer contains a plurality of components, and a total of said components has solubility of not greater than 0.2 g/liter to water in a temperature range in which said coated optical fiber is used.

5. A ribbon optical fiber, comprising:
a plurality of coated optical fibers of claim 1, 2, 3 or 4 arranged side by side; and
a common coating layer provided on said coated optical fibers.

* * * * *